P. H. GRACE.
AUXILIARY AIR DEVICE FOR INTERNAL COMBUSTION ENGINES.
APPLICATION FILED MAR. 17, 1913.
1,094,555.
Patented Apr. 28, 1914.
*Fig. 1.*
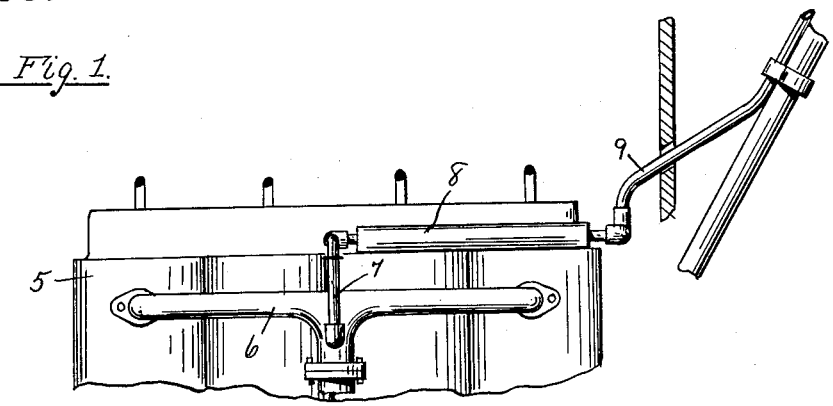
*Fig. 2.*
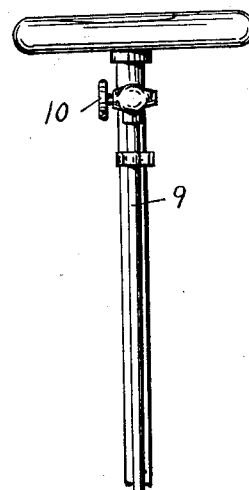
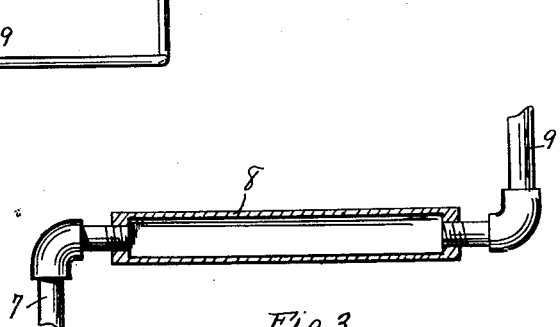
*Fig. 3.*
WITNESSES.
Frank Waterfield
INVENTOR
PATRICK H. GRACE.
by
Attorney.

UNITED STATES PATENT OFFICE.

PATRICK H. GRACE, OF LOS ANGELES, CALIFORNIA.

AUXILIARY AIR DEVICE FOR INTERNAL-COMBUSTION ENGINES.

1,094,555.  Specification of Letters Patent.  Patented Apr. 28, 1914.

Application filed March 17, 1913. Serial No. 755,028.

*To all whom it may concern:*

Be it known that I, PATRICK H. GRACE, a citizen of the United States, residing at the city of Los Angeles, county of Los Angeles, State of California, have invented new and useful Improvements in Auxiliary Air Devices for Internal-Combustion Engines, of which the following is a specification.

Heretofore it has been customary to admit a supply of air into the manifold of an internal combustion engine through manually controlled or automatically controlled valves, placed near the cylinders. In this construction cold air is admitted into the mixture from the carbureter so close to the cylinders that it does not thoroughly commingle before being admitted into the cylinders.

It is the object of my invention to supply heated air into the manifold of the engine near the cylinders. By furnishing heated air, should there be any globules of liquid fuel in the mixture in the manifold, they are broken up and vaporized by the hot air and the mixture is in better condition for explosion when it enters the cylinders than it would have been if cold air instead of hot air had been admitted into the manifold.

In the drawings accompanying these specifications and forming a part of this application, I have shown my device applied to an automobile engine, but it may be used on any explosion engine.

Figure 1 is a side elevation of a portion of the cylinders of an automobile engine showing the manifold and my auxiliary air device applied thereto. Fig. 2 is a view with parts broken away at right angles of Fig. 1. Fig. 3 is a longitudinal central section of the air heating drum or pipe.

In the drawings 5 are the cylinders of an internal combustion engine and 6 is the manifold. To the manifold and as near the cylinders as is practicable is connected an air supply pipe 7 which runs to and is connected to one end of the heating drum 8. An inlet pipe 9 is connected to the other end of drum 8. On the inlet pipe, preferably at the outer end, is an inlet valve 10 which is manually controlled to regulate the amount of air passing through the inlet pipe. The inlet pipe may be secured to the steering post or to any other part of the automobile where the valve can be easily reached by the driver. The drum is preferably placed in contact with the cylinders or with the exhaust pipe of the engine so that the air passing into the manifold shall be heated.

By supplying heated air into the manifold, it breaks up and vaporizes any globules of liquid that may be in the mixture passing through the manifold. By placing the heating drum as near the manifold as possible a larger quantity of heated air is readily accessible when needed. By admitting a supply of heated air into the manifold it eliminates the precision of adjustment of the carbureter that is required when cold air is admitted into the manifold.

Having described my invention, what I claim is:

An auxiliary air device for explosion engines comprising an air inlet pipe opening to the atmosphere at one end and at the other end connected to the manifold of the engine, said pipe having an enlarged chamber intermediate its ends situate near the manifold and in close proximity with a part of the engine which is heated when running; and a cock to control the admission of air into said pipe.

PATRICK H. GRACE.

Witnesses:
 MATT D. GRACE,
 WILLIAM C. SEYFRIEDT.